United States Patent [19]

Terry et al.

[11] Patent Number: 5,058,435
[45] Date of Patent: Oct. 22, 1991

[54] SINGLE DIAPHRAGM TRANSDUCER WITH MULTIPLE SENSING ELEMENTS

[75] Inventors: Stephen C. Terry; John H. Jerman, both of Palo Alto, Calif.

[73] Assignee: IC Sensors, Inc., Milpitas, Calif.

[21] Appl. No.: 369,899

[22] Filed: Jun. 22, 1989

[51] Int. Cl.⁵ .............................................. G01L 9/06
[52] U.S. Cl. ...................................... 73/727; 73/716; 73/721; 338/42
[58] Field of Search ................. 73/708, 720, 721, 727, 73/716; 338/4, 42

[56] References Cited

U.S. PATENT DOCUMENTS

| | | | |
|---|---|---|---|
| 3,820,401 | 6/1974 | Lewis | 73/727 |
| 4,207,551 | 6/1980 | Kautzky | 338/4 |
| 4,528,855 | 7/1985 | Singh | 338/4 |
| 4,550,612 | 11/1985 | Yamada et al. | 73/727 |
| 4,665,754 | 5/1987 | Glenn et al. | 73/727 |
| 4,702,113 | 10/1987 | Wareham | 73/720 |
| 4,766,655 | 8/1988 | Hickox | 73/727 |
| 4,777,826 | 10/1988 | Rud, Jr. et al. | 338/4 |
| 4,809,536 | 3/1989 | Nishiguchi | 73/727 |

OTHER PUBLICATIONS

C. S. Weaver Interim Report to the National Heart and Lung Institute, Grant Number HL 17604-01A1 entitled, "Wearable Blood Pressure and ECG Recording System", dated 1976.

Primary Examiner—Joseph A. Orsino
Assistant Examiner—Brent A. Swarthout
Attorney, Agent, or Firm—Oliff and Berridge

[57] ABSTRACT

A transducer having a plurality of sensing elements disposed in a single diaphragm wherein each of the sensing elements is spaced from every other of the sensing elements a predetermined distance so as to control interference among the sensing elements. Each of the sensing elements preferably comprises a plurality of piezoresistors each of which are coupled in a Wheatstone bridge configuration. This transducer achieves sensitive, accurate, high spatial resolution measurements of non-uniform pressures.

7 Claims, 2 Drawing Sheets

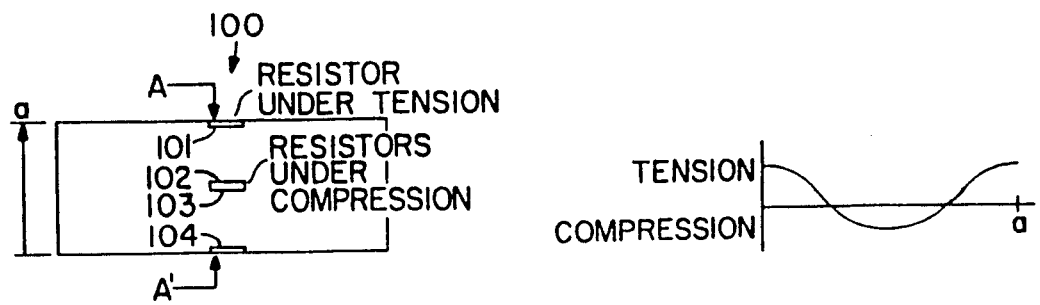
FIG. 1A
(PRIOR ART)
FIG. 1B
(PRIOR ART)
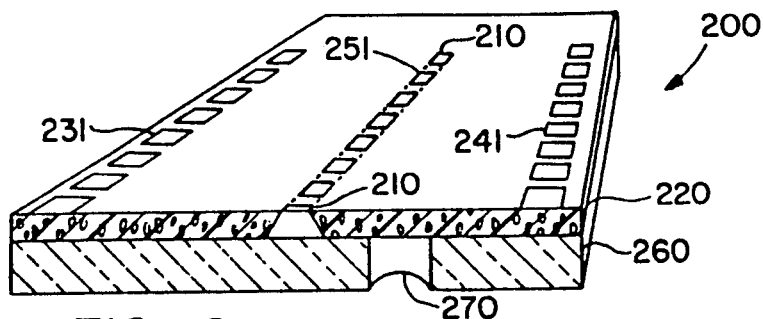
FIG. 2
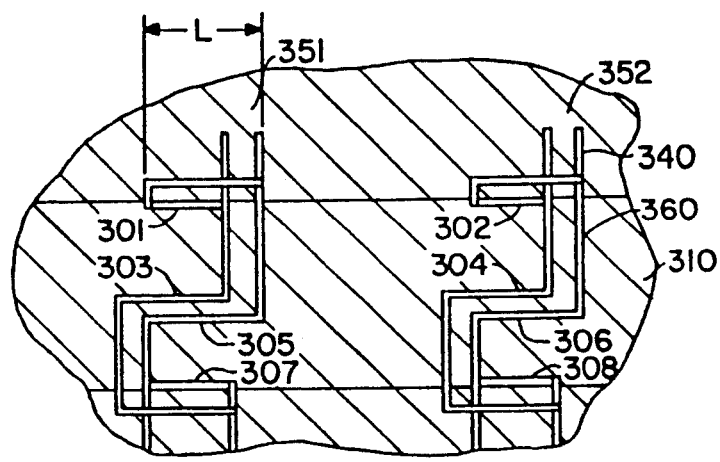
FIG. 3

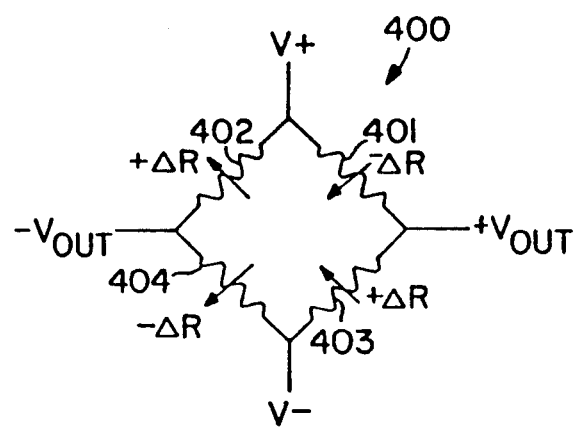
FIG. 4
FIG. 5
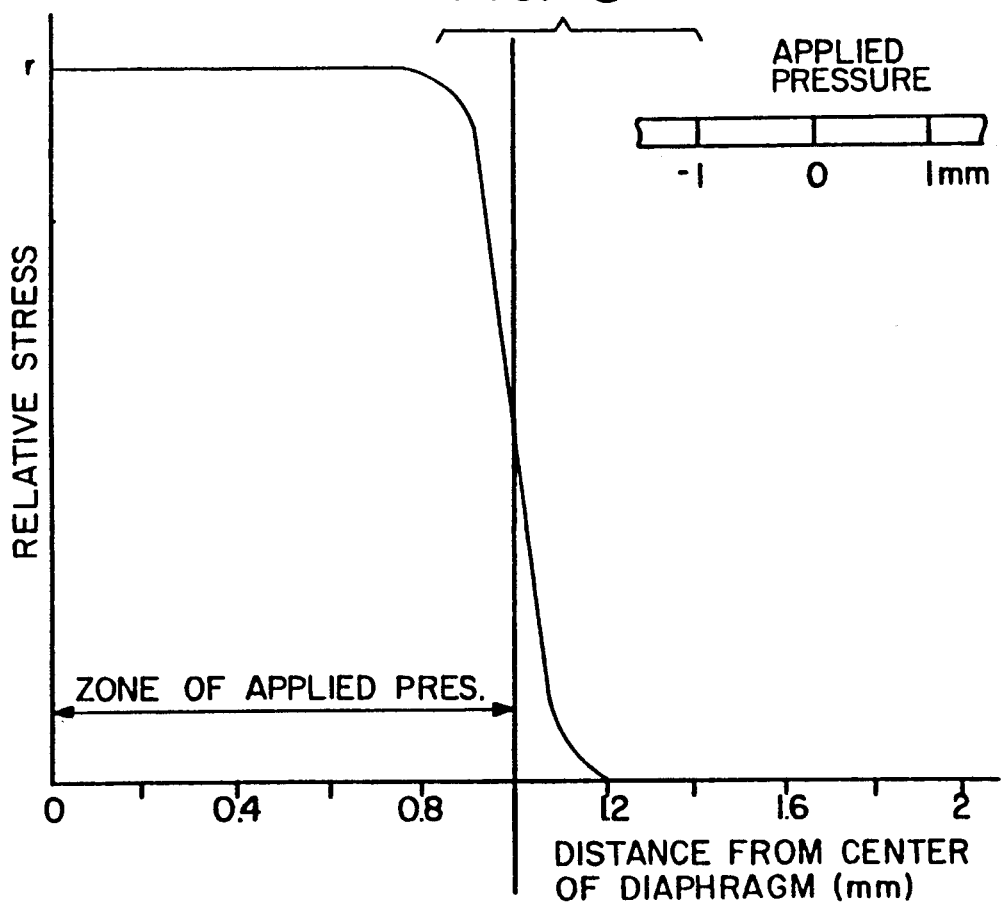

SINGLE DIAPHRAGM TRANSDUCER WITH MULTIPLE SENSING ELEMENTS

FIELD OF THE INVENTION

The present invention relates generally to the field of diaphragm pressure sensors and more particularly to the field of diaphragm transducers for measuring non-uniform pressures.

BACKGROUND OF THE INVENTION

Standard diaphragm pressure sensors for measuring hydrostatic (uniform) pressures are known which produce an output electric signal having an amplitude proportional to the pressure on the diaphragm. Although such pressure sensors require only one sensor element for sensing diaphragm deflections, it is a common practice to connect four sensors in a Wheatstone bridge configuration to maximize the output signal, the four sensors thereby constituting a single pressure sensor in application. Examples of such pressure sensors are U.S. Pat. Nos. 4,702,113 and 4,712,430 both to Wareham. Another pressure sensor, U.S. Pat. No. 4,770,045 to Nakagawa, has a plurality of strain gauges disposed on a diaphragm for high-sensitivity measurement of uniform pressures.

In silicon-based diaphragm pressure sensors, the bending stress on the diaphragm is typically sensed using a strain sensitive resistor which is diffused into a thin silicon diaphragm which is supported by a thicker silicon frame. A hydraulic pressure applied to one side of the diaphragm causes the diaphragm to bend which produces a stress in the resistor which may be electrically sensed. Such a resistor is referred to as a piezoresistor. In impurity-doped silicon sensors, the sensitivity of such a piezoresistor to stress is dependent upon the concentration of the diffused impurity, the direction of the current flow relative to the crystal lattice and the direction of the applied stress. Typically, p-type diffused resistors are oriented along the <110> directions in (100) silicon crystal. In this case, stress applied parallel to the resistor causes the resistance to increase and stress applied perpendicular to the resistor causes a decrease in resistance. Again, typically, four piezoresistors are connected in a Wheatstone bridge configuration to effectively constitute one pressure sensor.

The diaphragms typically utilized can be square, rectangular, or round. The rectangular diaphragm has been used in several different designs of pressure sensors for the measurement of uniform pressures such as that produced by liquids. In the rectangular diaphragm, the sensing element resistors are typically placed at or near the fixed edges and at or near the center of the diaphragm and connected in a Wheatstone bridge configuration. Depending on the aspect ratio (ratio of length to width of a rectangle) of the diaphragm, a problem with a relatively square configuration has been that stiffening of the diaphragm near its fixed edges can influence measurements of pressure in the sensing region of the diaphragm. A rectangular diaphragm having an aspect ratio of at least 2.3 to 1 achieves measurements in the sensing area of the diaphragm which are only minimally affected by the ends of the diaphragm.

Non-uniform pressures produced, for instance, by semi-rigid, non-fluid media present a problem for conventional diaphragm-type sensors since the pressure may not be uniform over the entire area of the diaphragm. In such a case, the sensing element resistors would be measuring a locally applied force plus strain on the diaphragm produced by applied forces in other regions of the diaphragm, resulting in inaccurate measurements. One solution to this problem is the deployment of an array of diaphragms each having its own separate sensing element. C. S. Weaver, et al., Interim Report to the National Heart and Lung Institute (Grant HL17604-01A1) 1976. However, because of the physical requirements of each diaphragm (such as the fixed edges and coupled circuitry) such a system has disadvantages in terms of the separations required between adjacent diaphragms, thereby decreasing resolution. An example of a non-uniform pressure requiring accurate, high resolution measurements is the transcutaneous measurement of blood pressure by the method of tonometry.

SUMMARY OF THE INVENTION

It is a principal object of the present invention to provide a pressure sensor capable of accurately measuring non-uniform pressures.

It is a further object of the present invention to provide a pressure sensor comprising a single diaphragm capable of measuring non-uniform pressures.

It is another object of the present invention to provide a pressure sensor having a high degree of spatial resolution.

Accordingly, to achieve these and other objects, the present invention comprises a transducer having a plurality of sensing elements disposed in a single diaphragm wherein each of the sensing elements is spaced from every other of the sensing elements a predetermined minimum distance so as to provide localized pressure measurement by the sensing elements. Each of the sensing elements preferably comprises a plurality of piezoresistors which are coupled in Wheatstone bridge configurations.

A diaphragm according to the present invention having a plurality of sensing elements and the minimum separation of the sensing elements achieves sensitive, accurate, high spatial resolution measurements of non-uniform pressures.

The foregoing and other objects, features, and advantages of the present invention will become clear to those skilled in the art from the following more particular description of the invention and the accompanying drawings.

BRIEF DESCRIPTION OF THE DRAWINGS

FIG. 1A is a schematic view of a typical prior art rectangular pressure sensing diaphragm.

FIG. 1B is a plot of the stress characteristic versus distance across a rectangular diaphragm of width a.

FIG. 2 is a perspective view of a single diaphragm pressure sensor according to the present invention.

FIG. 3 is plan view of the piezoresistor placement in the sensing elements of the pressure sensor according to the present invention.

FIG. 4 is a schematic diagram of the coupling of the sensing resistors in a Wheatstone bridge according to the present invention.

FIG. 5 is a plot of calculated stress resulting from a stripe of applied force versus distance from the center of the applied force in a diaphragm of 200 $\mu$m width according to the present invention.

DETAILED DESCRIPTION OF THE INVENTION

The present invention comprises a transducer including at least one diaphragm-type pressure sensor each having an array of sensing elements formed thereon which sense pressures substantially independently of each other. The diaphragm may be of any desired shape, but the description following will focus on a rectangular diaphragm as the preferred shape.

A silicon diaphragm responds to an applied force by bending. To optimize pressure transduction into an electrical signal, a piezoresistor is disposed on the diaphragm where the induced bending stress is maximum. A typical prior art rectangular diaphragm is shown in FIG. 1A.

Rectangular diaphragms such as diaphragm 100 in FIG. 1A are known in the prior art for measuring uniform (hydrostatic) pressure. Because of the pressure-induced stress distribution in diaphragm 100, a plurality of piezoresistors 101–104 are typically utilized as a single sensing element to maximize the sensitivity of the sensed deflections. The piezoresistors are typically placed along the minor axis of rectangular diaphragm 100 and connected in a Wheatstone bridge configuration. Maximum sensitivity is achieved by placing two piezoresistors 101 and 104 at the edges of diaphragm 100 and two piezoresistors 102 and 103 at the center. Pressure applied to the silicon diaphragm from the side from which the piezo-resistors are formed causes a deflection of diaphragm 100 which will cause piezoresistors 101 and 104 to be under tensile stress and piezoresistors 102 and 103 to be under compressive stress. A plot of the stress characteristic versus distance across a rectangular diaphragm of width a is shown in FIG. 1B.

For applications where the pressure is applied by a semi-rigid, non-fluid source or the like, the applied pressure may not be uniform over the entire area of the diaphragm. In such cases, the shape of the diaphragm deflection may be significantly different from the shape which results from a uniform pressure distribution. Each of the piezo-resistors may be responding to both the localized diaphragm stress (which results from the localized forces) plus the stress due to the deflection of the whole diaphragm by the composite of all of the localized forces. The output signal from a bridge consisting of piezoresistors 101–104 will be a complicated function of the applied pressure distribution and will likely not be an accurate measure of either the local or average pressure. It is most desirable that each sensing region of the diaphragm respond only to the pressure being applied to that region.

In the prior art, the spatial resolution of a sensor for non-uniform pressure measurements is limited by the proximity of the placement of the diaphragms. Separate individual silicon diaphragms are utilized in the prior art (C. S. Weaver., Interim report to the National Heart and Lung Institute (Grant HL17604-01A1) 1976) with the minimum separation between diaphragms being determined by the sloping sidewalls of the etched cavities which form the sensing diaphragms. This limits the proximity between diaphragms.

The present invention contemplates an elongated rectangular diaphragm having an array of very closely spaced pressure sensing elements which are all fabricated on the same diaphragm. The diaphragm of the present invention is thus preferably long and narrow.

The single diaphragm eliminates the need for multiple diaphragms which require mechanical separations between the diaphragms which limit the proximity of individual diaphragm sensors. The present invention, with its multiple sensors on a single diaphragm, allows the pressure sensing elements to be positioned substantially closer together than in the prior art.

As described in greater detail below, the preferred embodiment of the present invention comprises an elongated rectangular sensor having multiple sensors spaced along the diaphragm length. Such a diaphragm is shown in FIG. 2.

FIG. 2 is a perspective view of a portion of a silicon pressure sensor 200 having a single long rectangular diaphragm 210 fabricated with an integral silicon frame 220 which is itself mounted on a glass base 260. A plurality of sensing regions or sensing elements (of which 251 is exemplary) are formed along the length of diaphragm 210. Shown arrayed along the edges of frame 220 are bonding pads (of which 231 and 241 are exemplary) for TAB bonding of connectors. A vent hole 270, drilled through glass substrate 260 and connecting with the cavity under diaphragm 210, allows the measurement of gage pressure. Typical dimensions for pressure sensor 200 are 0.2×7 mm for diaphragm 210 which has a diaphragm thickness of approximately 4.5 $\mu$m. The spacing between each sensing element along the length of diaphragm 210 should be on the order of 200 $\mu$m, which is the width of diaphragm 210. It should be noted that in some applications where the interference among sensing elements has less stringent requirements, or where the interference can be accounted for by external means (such as computer processing), the placement of the sensing elements can be made closer than one diaphragm width if desired. The interference among sensing elements in these cases is still controlled by the sensing element spacing and the general configuration of the diaphragm. One embodiment of the present invention has an aspect ratio of greater than 5 and includes 31 sensing regions along the length of the diaphragm.

The sensing elements 251 are each preferably disposed in diaphragm 210 as shown in FIG. 3, which is a plan view of a segment of the top side of diaphragm 210. Sensing element 351 comprises piezoresistors 301, 303, 305, and 307 which are connected in a Wheatstone bridge configuration and arrayed parallel to the major axis and along a minor axis of diaphragm 310 (210 in FIG. 2). Similarly, sensing element 352 comprises piezoresistors 302, 304, 306, and 308 which are also connected in a Wheatstone bridge configuration and arrayed parallel to the major axis and along a minor axis of diaphragm 310. The piezoresistors are disposed near the edges and near the center of diaphragm 310 as shown. Aluminum conductors, exemplified by 340, provide electrical contacts for sensing elements 351 and 352. In diaphragm 310 there are diffused conductors, exemplified by 360, which serve along with aluminum conductors 340 to connect the sensing resistors 301, 303, 305, 307 in a Wheatstone bridge configuration. The backwards "S" pattern of a given sensing element 351 is repeated typically, for instance, every 200 $\mu$m to produce a desired 200 $\mu$m spacing between sensing elements along the length of diaphragm 310.

The four piezoresistors in each sensing element, such as 351, each have their own output signal lines, as shown in FIG. 3. The connections of these piezoresistors to form a Wheatstone bridge configuration for the purpose of producing electrical signals representative of the stress in the material are shown in FIG. 4.

The Wheatstone bridge configuration maximizes the electrical signal generated by the piezoresistors. When diaphragm 210 (of FIG. 2) is deflected downward (away from the surface containing sensing elements 251) piezoresistors 401 and 404, which are under tension perpendicular to the current flow, decrease in resistance, and piezoresistors 402 and 403, which are under compression, increase in resistance. For a Wheatstone bridge 400 utilizing matched piezoresistors, the output signal is proportional to δR, the magnitude of the resistance change, which is in turn proportional to the applied pressure. Another embodiment of the present invention utilizes a half Wheatstone bridge configuration, which is known in the electronic arts, in order to minimize the number of connections.

It has been determined that as a diaphragm's aspect ratio is increased, local pressure measurements by a given sensing element are essentially independent of diaphragm movements far removed from that sensing element. Similarly, the effects on diaphragm movement of the end edges of the diaphragm decrease rapidly with distance from these end edges. At a distance of one diaphragm width from the end edge, the measured stresses are within approximately 2% of the stresses measured at points far from the end edges. This phenomenon is generalized in one embodiment of the present invention to provide a pressure sensor having sensing element points which are at least a diaphragm's width apart along the long dimension of the diaphragm. This ensures that the pressure measured at a given point will be influenced by the pressure at another point by less than a factor of 3%. For greater separations of the sensing element points, the interference between points will be substantially negligible. Lesser separations may be useful in some applications to provide greater resolution of the applied pressure distribution.

FIG. 5 is a plot of calculated stress resulting from a stripe of applied force versus distance from the center of the applied force in a diaphragm of 200 μm width. FIG. 5 shows that at a distance of 0.3 mm from the edge of the force stripe, which is 1.5 diaphragm-widths, the force is negligible. Therefore, any locally applied pressure will only affect the diaphragm within 1.5 diaphragm-widths of the boundary of the applied pressure area.

In operation, pressure sensor 100 achieves a sensitivity of at least 10 μV/mm Hg/V with an interference between sensing regions of less than 3%. Both analytical models and finite element analysis were used to predict the sensitivity of the piezoresistive elements in the diaphragm.

In designing the pressure sensor of the present invention, the main trade-off is between sensitivity and spatial resolution. The sensitivity of the pressure sensor is dependent upon the width (a) of the diaphragm and is proportional to $a^2$. The proximity of two adjacent sensing elements having minimal crosstalk (the interaction between adjacent sensing regions) is also dependent upon the diaphragm width. Thus, high spatial resolution (close sensing element-to-element spacing) is achieved at the cost of decreased sensitivity. In one embodiment of the present invention, the diaphragm width is 150 μm and the centers of the sensing element are 200 μm apart. As can be seen in FIG. 3, the length of the piezoresistors, L, in the sensing element reduces the separation of the sensing element and thus the longer the piezoresistors, the greater the crosstalk. The length of the piezoresistors is a compromise between the reproducibility of the diffused piezoresistors fabricated by the photolithographic process and the amount of crosstalk allowable in the finished pressure sensor.

One embodiment of the pressure sensor of the present invention has been formed as a 5×10 mm chip using standard pressure sensor fabrication processes. The fabrication includes ion implantation of both the piezoresistors and the interconnecting diffusions. An electrochemical etch stop is employed to accurately set the thickness of the diaphragm during the silicon etching step. After aluminum metallization and lithography, a layer of silicon nitride is deposited on the front side of the wafer to serve as a passivation layer. In subsequent process steps, windows are opened in the passivation layer above the diaphragm and the bonding pads and gold bumps are electroplated on the bonding pads to allow for TAB bonding. The final fabrication step is anodic bonding of the silicon wafer to the Pyrex glass wafer which has previously had vent ports cut through it. The fabrication of the present invention is by standard proven pressure sensor manufacturing techniques and thus is well adapted for commercial manufacture.

One application of the present invention is the transcutaneous measurement of blood pressure utilizing the method of tonometry. The pressure sensor of the present invention is pressed against the skin of a subject above the radial artery in the wrist. When the artery beneath the skin is partially collapsed by the force of pressing the pressure sensor against the skin, the pressure in the artery is transferred through the skin and can be measured at the surface. Since the skin is a semi-rigid substance, the pressure sensor must measure very localized pressures and not a general hydrostatic pressure. The present invention can measure the pressure distribution above the artery from which the actual pressure within the artery is thereby determined. Since the pressure in the artery is coupled to the sensor diaphragm through solid tissue rather than through a fluid, a common diaphragm can be used for all of the sensing elements, each element sensing the local pressure being applied to the diaphragm by the skin above it. In one embodiment, the pressure sensor is 7 mm long, ensuring that at least some of the sensing elements lie above the artery. The present invention allows the reduction of the separation of the sensing elements from 700 μm in prior art multiple diaphragm sensors to 200 μm according to the present invention. Prior art pressure sensors were limited in resolution because of the (111) side walls which would be present between adjacent cavities if the sensing elements were formed with individual diaphragms etched from the back side of a wafer.

It has been determined that crosstalk can be held to 2-3% if the sensing elements are separated by 1.5 diaphragm-widths. In addition to crosstalk between sensing elements, there is also some crosstalk attributable to the skin. Pressure from the artery traveling through the tissues tend to diffuse outward as it propagates to the skin. In general, the closeness of the sensing elements in the present invention is limited only by the distance required to reduce crosstalk between sensing elements to some desirable amount.

The above description of the present invention has been made with reference to a large aspect ratio rectangular single diaphragm structure with multiple sets of piezo-resistors. It will be apparent to those skilled in the art that the present invention is applicable to other configurations of single diaphragm sensors. In addition, multiple diaphragms with multiple sensors are within the scope of the present invention. For instance, several rows or arrays of diaphragms each having multiple sensing elements, depending on the needs of the particular application can be utilized.

Accordingly, various modifications to the present invention will be apparent from the above description and accompanying drawings and the present invention is to be limited solely by the scope of the following claims.

What is claimed is:

1. A transducer, comprising:
   at least one rectangular frame having bonding pads disposed thereon for receiving a plurality of conductors and the like;
   at least one rectangular diaphragm having an aspect ratio greater than or equal to 5, formed from said frame and disposed along the major axis of said frame and having a thickness substantially less than that of said frame;
   a plurality of pressure sensing elements each including first, second, third, and fourth piezoresistors, said sensing elements being disposed in said diaphragm so that each said sensing element is spaced at least one diaphragm width apart from every other of said sensing elements so as to achieve localized pressure measurement by said sensing elements;
   said first, second, third, and fourth piezoresistors being disposed in said diaphragm such that said first piezoresistor is proximate and parallel to one long edge of said diaphragm, said second piezoresistor as proximate and parallel to the other long edge of said diaphragm, said third piezoresistor is proximate and parallel to the major axis of said diaphragm, and said fourth piezoresistor is proximate and parallel to said third piezoresistor, and said piezoresistors are connected in a Wheatstone bridge configuration;
   said first, second, third, and fourth piezoresistors being coupled in a balanced Wheatstone bridge configuration having one of said piezoresistors in each leg of said bridge; and
   a base for supporting said frame.

2. The transducer of claim 1 wherein said frame and said diaphragm are composed of silicon.

3. The transducer of claim 1 wherein said base includes a vent enabling gaseous communication with the underside of said diaphragm for measuring gage pressure utilizing said diaphragm and said sensing elements.

4. The transducer of claim 1 having a plurality of said pressure sensing elements spaced approximately 200 $\mu$m apart.

5. The transducer of claim 1 having at least one passivation layer deposited on a side of said transducer.

6. A transducer, comprising:
   at least one rectangular frame having bonding pads disposed thereon for receiving a plurality of conductors and the like;
   at least one rectangular diaphragm having an aspect ratio greater than or equal to 5, formed from said frame and disposed along the major axis of said frame and having a thickness substantially less than that of said frame;
   a plurality of pressure sensing elements each including first, second, third, and fourth piezoresistors, said pressure sensing elements being disposed in said diaphragm so that each said pressure sensing element is spaced approximately one diaphragm width apart from every other of said pressure sensing elements so as to selectively control the level of interference among said pressure sensing elements;
   said first, second, third, and fourth piezoresistors being disposed in said diaphragm such that such first piezoresistor is proximate and parallel to one long edge of said diaphragm, said second piezoresistor is proximate and parallel to the other long edge of said diaphragm, said third piezoresistor is proximate and parallel to the major axis of said diaphragm, and said fourth piezoresistor is proximate and parallel to said third piezoresistor and said piezoresistors are connected in a Wheatstone bridge configuration;
   said first, second, third, and fourth piezoresistors being coupled in a balanced Wheatstone bridge configuration having one of said piezoresistors in each leg of said bridge; and a base for supporting said frame.

7. A transducer, comprising:
   an elongated unitary rectangular diaphragm having a major axis;
   a plurality of pressure sensing elements disposed in said elongated unitary diaphragm along the major axis such that each of said pressure sensing elements is spaced from every other of said pressure sensing elements a predetermined distance, so as to control measurement interference among said pressure sensing elements; and
   each of said pressure sensing elements comprises first, second, third and fourth piezoresistors, said piezoresistors being disposed in said rectangular elongated unitary diaphragm, such that said first piezoresistor is proximate and parallel to one long edge of said rectangular elongated unitary diaphragm, said second piezoresistor is proximate and parallel to the other long edge of said rectangular elongated unitary diaphragm, said third piezoresistor is proximate and parallel to the major axis of said rectangular elongated unitary diaphragm, and said fourth piezoresistor is proximate and parallel to said third piezoresistor, and said piezoresistors are connected in a Wheatstone bridge configuration.

* * * * *